March 19, 1968  R. E. JEPSEN  3,373,999

PISTON RINGS

Filed July 26, 1965  2 Sheets-Sheet 1

FLUID PRESSURE ON RING

NET FLUID PRESSURE

INVENTOR.
ROBERT E. JEPSEN
BY
Ronald B. Sheur
ATTORNEY

United States Patent Office 3,373,999
Patented Mar. 19, 1968

3,373,999
PISTON RINGS
Robert E. Jepsen, Emmaus, Pa., assignor to Air Products and Chemicals, Inc., Allentown, Pa., a corporation of Delaware
Filed July 26, 1965, Ser. No. 474,782
2 Claims. (Cl. 277—193)

ABSTRACT OF THE DISCLOSURE

A pair of fluid sealing piston rings in which the upper ring is a split ring readily expandable into sealing engagement with the cylinder and the lower ring is a nonsplit, integral ring having a normal outer diameter less than that of the cylinder. Fluid passages admit high-pressure fluid to the interior of the integral ring so as to expand it into sealing engagement with the cylinder only when such fluid pressure exceeds a predetermined value.

---

The present invention relates to improved piston rings for use in reciprocating pumps, compressors, expansion engines, and the like. More particularly, the present invention relates to a multiple piston ring design wherein the total amount of wear on the piston rings is substantially reduced.

Although it will subsequently become apparent that the broad principles of the present invention may be readily applied to the design of various types of piston rings including those employed in hydraulic cylinders and in internal combustion engines, the illustrated embodiment will be described in connection with piston rings particularly designed to meet the exceptionally severe and unique problems associated with their use in compressors and expansion engines which are located in cryogenic refrigeration circuits such as those described in co-pending patent applications Ser. No. 120,008 and 252,359 now Patent Nos. 3,205,679 and 3,199,304, respectively. In such cryogenic refrigeration circuits, the piston rings cannot be lubricated with conventional lube oils since the oil would freeze at the cryogenic operating temperatures which are in the order of minus 150° F. to minus 450° F. In addition, cryogenic applications require the compression or expansion of substantially moisture-free refrigerants such as pure helium or nitrogen so that even the normal lubricating effect of moisture is lacking. At the same time, the operating pressures may be as high as 1500 p.s.i. while the cross sectional area of the pistons is generally in the order of two inches and sometimes as small as one-half inch. Since the loss of even very small amounts of the refrigerant results in a large loss of efficiency, it will be apparent that sealing values acceptable in internal combustion engines and hydraulic cylinders are wholly unacceptable in such cryogenic environments. Furthermore, typical cryogenic compressors and expanders require piston velocities as high as 500 ft./min. with the results that the piston rings wear very rapidly which, in turn, results in unacceptable sealing performance.

In brief the present invention provides a plurality of axially spaced piston rings wherein the uppermost ring is a split-ring designed for quick-seating against the cylinder wall and wherein the lower ring is a nonsplit integral ring having a selected composition and a predetermined radial thickness such that the maximum expansion of this ring permits only slight frictional contact between the ring and the cylinder wall during those portions of each piston stroke when the working fluid in the cylinder is at maximum pressure and, during all other portions of each piston stroke, the lower ring exerts no frictional pressure against the cylinder wall.

The principal object of the present invention is to provide a piston ring assembly specifically designed for minimum wear of the rings while maintaining a reduced amount of leakage.

This object, as well as other objects relating more particularly to the details of construction and operation, will become more fully apparent from the following description when taken with the accompanying drawing wherein.

Figure 1:
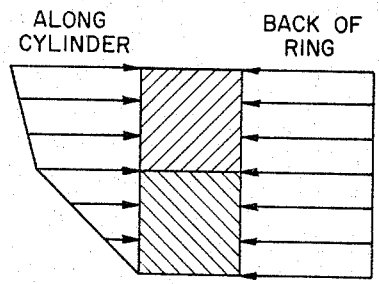
FIGURE 1 is a vector diagram illustrating the magnitude of the fluid pressures acting on a pair of piston rings.
Figure 2:
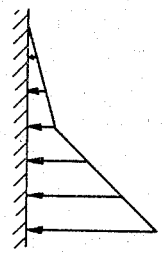
FIGURE 2 is a vector diagram illustrating the net fluid pressure acting on the piston rings shown in FIGURE 1.
Figure 4:
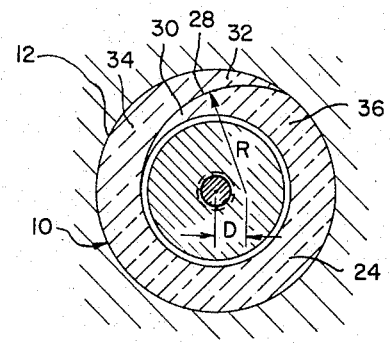
FIGURE 4 is a sectional view of the upper piston ring taken along the plane indicated by the view line 4—4 of FIGURE 3.
Figure 5:
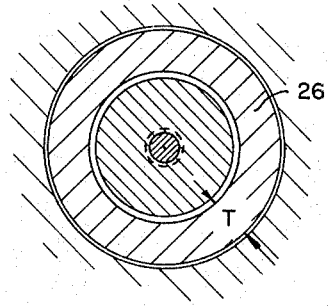
FIGURE 5 is a sectional view of the lower piston ring taken along the plane indicated by view line 5—5 of FIGURE 3.

Referring first to FIGURE 1, extensive tests of the factors causing wear of piston rings have indicated that there is a substantial fluid pressure gradient along the wall of the cylinder such that the fluid pressure between the cylinder wall and the piston rings substantially decreases as the distance away from the working fluid chamber increases. At the same time, the fluid pressures behind the piston ring remain substantially constant along the length of the cylinder wall. Thus, as shown in FIGURE 2, there is a net fluid pressure gradient acting on the interior of the piston rings such that the lowermost ring in a conventional two-ring system is forced into much greater frictional engagement with the cylinder wall than is the upper ring. Accordingly, the amount of wear on the lower ring is generally in the order of five to six times the amount of wear on the upper ring. Thus, it is this excessive amount of wear on the lower ring which is substantially reduced by the practice of the present invention.

Figure 3:
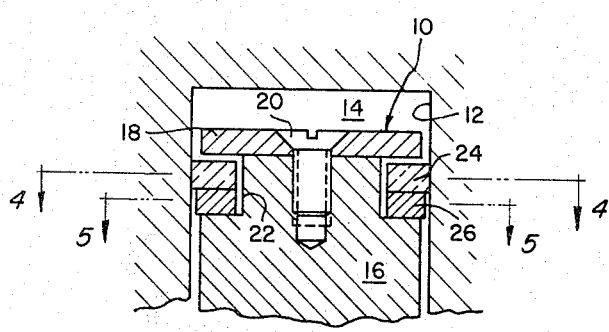
FIGURE 3 is a side elevational view illustrating a piston and cylinder assembly in cross section.

Referring now to FIGURE 3, numeral 10 generically indicates a piston mounted for reciprocation within a cylinder having walls 12 defining a working fluid chamber 14. Piston 10 is composed of a main body portion 16 and a removable top portion 18 which may be rigidly secured together by any suitable means such as bolt 20. The upper end of main body portion 16 is formed with a reduced diameter such that a piston ring groove 22 is formed upon the assembly of the two piston portions. Alternatively, it will be apparent that groove 22 may be formed in top portion 18 or it may be formed partially in each of the piston portions.

Groove 22 is of sufficient size to receive a pair of piston rings 24 and 26. Ring 24 is a split-ring and is preferably of the type more fully described in detail in co-pending application Ser. No. 385,947 filed July 29, 1964. In general, this ring is characterized by the provision of an arcuate joint 28 between the ends of the ring which permits the ring to radially expand without forming a leakage path between the joint faces. This is achieved by selecting the radius of curvature R so as to be greater than the internal ring radius and less than the external ring diameter. Furthermore, it has been found that the center of revolution of radius R should be positioned on a diameter of the ring at a point spaced from the center of the ring by a distance D which is less than one-half the internal ring diameter so that the taper of radially inner tip 30 is less than that of radially outer tip 32. As a result, the thicker tip portion 32 which is subject to frictional wear provides maximum heat conduction away from the periphery while the thinner tip portion 30 is more deformable and therefore provides maximum sealing engagement against end 34. In addition, it has been discovered that, within the above criteria, maximum wear-life will result if the radius of curvature R is such that the radial thickness of tip portion 32 is in the order of two-thirds of the total radial thickness of the ring when measured at the mid-point of the arcuate interface.

Since this ring is of a split construction, ring 24 readily expands in the radial direction upon the application of fluid pressure to the internal surface of the ring. Thus, the ring quickly seats against the cylinder wall 14 as the fluid pressure in the working chamber begins to rise slightly as, for example, upon the beginning of a compression stroke in a pump or compressor.

Lower ring 26 is of a nonsplit construction and is hereinafter referred to as being an integral ring. In the practice of the present invention, compositon, radial thickness T and the initial outer diameter of this ring are particularly selected such that the ring is capable of only a precise amount of radial expansion and this amount is defined as that which is necessary to cause slight frictional engagement of ring 26 against cylinder wall 12 when the fluid pressure behind the ring begins to approach its maximum value. That is, as the pump or compressor piston nears its top, dead-center position during the compression stroke, the maximum fluid pressure is sufficient to expand ring 26 into light frictional engagement with the cylinder wall. During all other portions of the pumping cycle, the ring 26 is designed such that the lower fluid pressures acting against its interior surface are insufficient to cause engagement of this ring with the cylinder wall. In this manner, the wear on the lower ring is precisely controlled so that, in the optimum case, the lower ring reaches the limit of tolerable wear at the same time as the upper ring.

Figure 6:
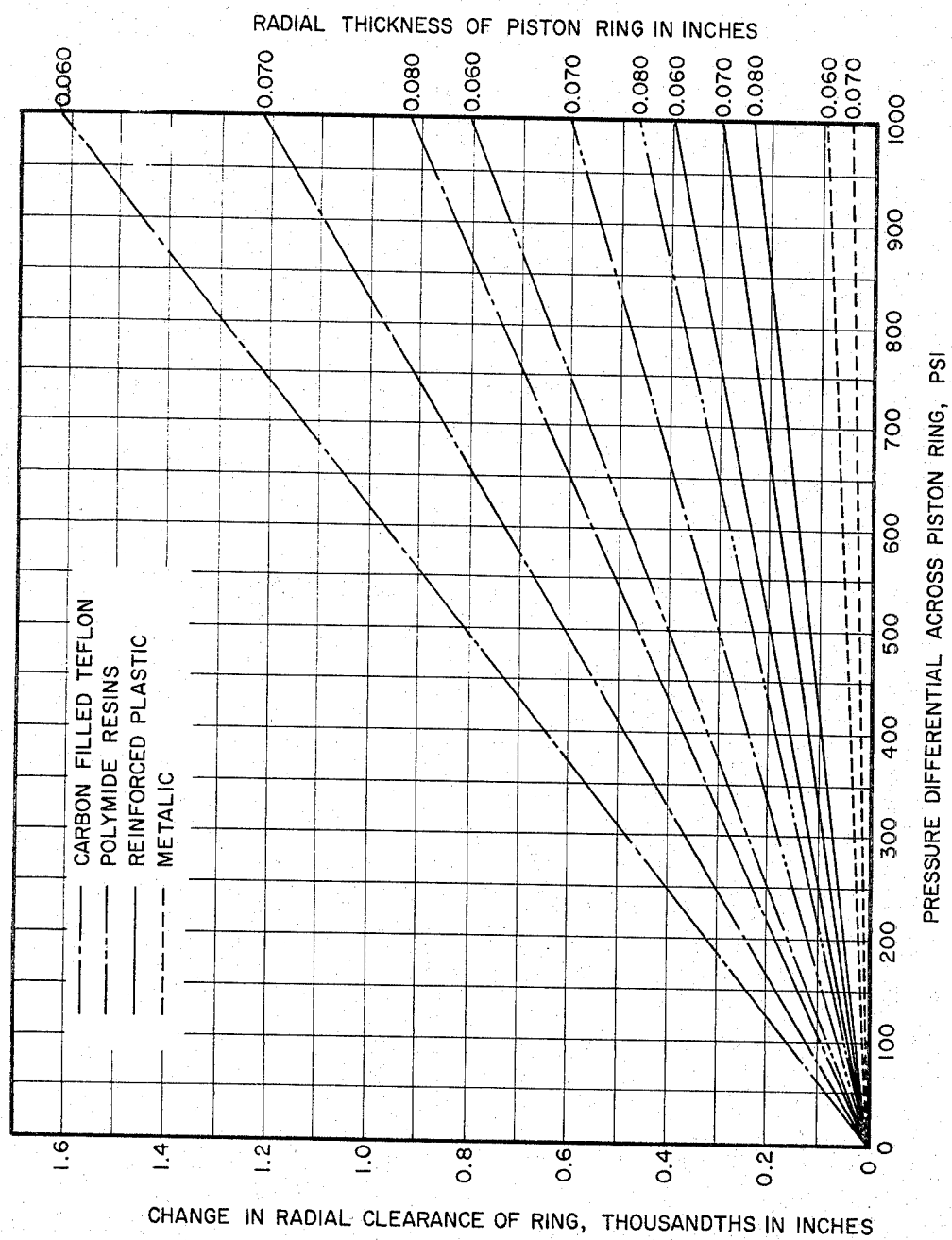
FIGURE 6 is a graph illustrating the change in radial clearance of the lower piston ring as a function of the pressure differential across the ring for various ring compositions and various radial thicknesses.

From the foregoing description it will be apparent that there are a large number of combinations of radial thicknesses, materials of composition, and resulting changes in radial clearance of the ring. However, for purposes of illustration, some of these possible combinations are illustrated in FIGURE 6. For cryogenic applications, it is essential that the rings be impregnated or coated with dry film lubricants and these may be selected from such materials as sodium molybdates, silver, barium, or phthalocyanine among others. The ring material which is impregnated or coated may be selected from such materials as sintered bronze, Teflon, polyimide resins, epoxy and phenolic resins, impergnated Micarta or carbons, nylon and carbon-graphite compositions among others. Thus, FIGURE 6 shows that a wide range of radial clearances may be obtained by the suitable combination of radial thicknesses in the order of .060 to .080 depending upon the selected material of composition and the selected pressure differential across the lower ring. Of course, numerous other combinations of thickness, pressure, and composition will appear to those skilled in the art. Thus, it is to be understood that the foregoing description is merely illustrative of the invention and that the latter is not to be limited other than as specifically set forth in the following claims including all patentable equivalents thereof.

What is claimed is:

1. In a piston and cylinder assembly forming a variable volume fluid chamber, the improvement comprising: first and second annular fluid sealing rings carried by, and positioned along the length of said piston, said first ring being positioned closer to said fluid chamber than said second ring, passage means communicating with said fluid chamber for applying fluid pressure to the radially inner surfaces of both of said rings, said first ring being a split ring readily expandable into sealing engagement with the cylinder upon the application of relatively low fluid pressure, said second ring being a nonsplit, integral ring having a normal external diameter less than the diameter of the cylinder, the composition and thickness of said second ring being such that said second ring expands into sealing engagement with the cylinder only upon the application of fluid pressure substantially greater than said relatively low fluid pressure.

2. The structure as claimed in claim 1 wherein said split ring comprises a one-piece ring having circumferentially extending, tapered end portions overlapping each other along the radial direction so as to form a sealed interface, said interface comprising a continuous arc forming a portion of a circle having a predetermined radius, said predetermined radius being greater than the internal radius of the split ring and less than the external diameter of the split ring.

References Cited
UNITED STATES PATENTS

| | | | |
|---|---|---|---|
| 831,603 | 9/1906 | Davis | 277—79 |
| 1,355,237 | 10/1920 | Maloney | 277—222 |
| 1,405,331 | 1/1922 | Reid | 277—222 |
| 1,781,183 | 11/1930 | Lewis | 92—183 |
| 2,591,230 | 4/1952 | Bertrand | 92—182 |
| 2,518,253 | 8/1950 | Reis | 277—235 X |
| 2,807,511 | 9/1957 | Fleming | 277—235 X |
| 2,905,512 | 9/1959 | Anderson | 277—235 |
| 3,165,896 | 1/1965 | Baldwin | 92—182 X |

MARTIN P. SCHWADRON, *Primary Examiner.*

G. N. BAUM, *Assistant Examiner.*